(12) United States Patent
Meyer

(10) Patent No.: US 6,999,529 B1
(45) Date of Patent: Feb. 14, 2006

(54) DIGITAL AM DEMODULATOR

(75) Inventor: Matthias Meyer, Quickborn (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/563,303

(22) Filed: May 2, 2000

(30) Foreign Application Priority Data

May 4, 1999 (DE) ................................ 199 20 362

(51) Int. Cl.
*H03D 1/00* (2006.01)
*H03D 1/24* (2006.01)
*H04L 27/06* (2006.01)
*H04H 1/00* (2006.01)

(52) U.S. Cl. ...................... 375/340; 375/344; 375/324; 375/321; 370/312

(58) Field of Classification Search ........ 375/321–344; 370/312
See application file for complete search history.

(56) References Cited

U.S. PATENT DOCUMENTS

| 4,803,700 A | * | 2/1989 | Dewey et al. | ............... | 375/321 |
| 4,896,336 A | * | 1/1990 | Henely et al. | ............... | 375/324 |
| 5,230,011 A | * | 7/1993 | Gielis et al. | ................. | 375/344 |
| 5,428,610 A | * | 6/1995 | Davis | .......................... | 370/312 |

OTHER PUBLICATIONS

"A Unified Algorithm for Elementary Functions", by J.S. Walther, Spring Joint Computer Conference 1971, pp. 379-385.

* cited by examiner

Primary Examiner—Stephen Chin
Assistant Examiner—Cicely Ware
(74) Attorney, Agent, or Firm—Michael J. Ure

(57) ABSTRACT

For a digital demodulator for AM demodulation of a difference sound signal in a digital multiplex signal, which multiplex signal also comprises a sum sound signal in the baseband position and a pilot carrier at a pilot frequency, and the difference sound signal is modulated on a carrier at twice the pilot frequency, an extremely simple and adjustment-free construction is ensured in that CORDICs (1, 7) are provided which perform a coordinate transformation of polar coordinates into cartesian coordinates and each have a phase input, two amplitude inputs assigned to the coordinates x and y and two outputs assigned to the coordinates x and y, in that a phase-locked loop comprising a first CORDIC (1), a loop filter (2) and an accumulator (4) are provided, which phase-locked loop supplies a phase ramp signal whose repetition frequency is dependent on the input signal of the accumulator, in that the multiplex signal at an amplitude input of the first CORDIC (1), the output signal of the accumulator (4) at the phase input of the first CORDIC (1) and that output of the first CORDIC (1) which is not assigned to the same coordinate as the amplitude input used are applied to the loop filter (4) whose output signal is superimposed by means of a first superposition stage (3) on a frequency selection signal indicating a pilot nominal frequency, and the output signal of the superposition stage (3) is applied to the accumulator input (4), in that a second CORDIC (7) is provided, one amplitude input of which receives the multiplex signal with the suppressed pilot and the phase input of which receives the output signal from a multiplier (5) whose input receives the output signal from the accumulator (4) and multiplies said output signal by a factor of two, and in that the output of the second CORDIC (7) supplies the demodulated difference sound signal.

8 Claims, 1 Drawing Sheet

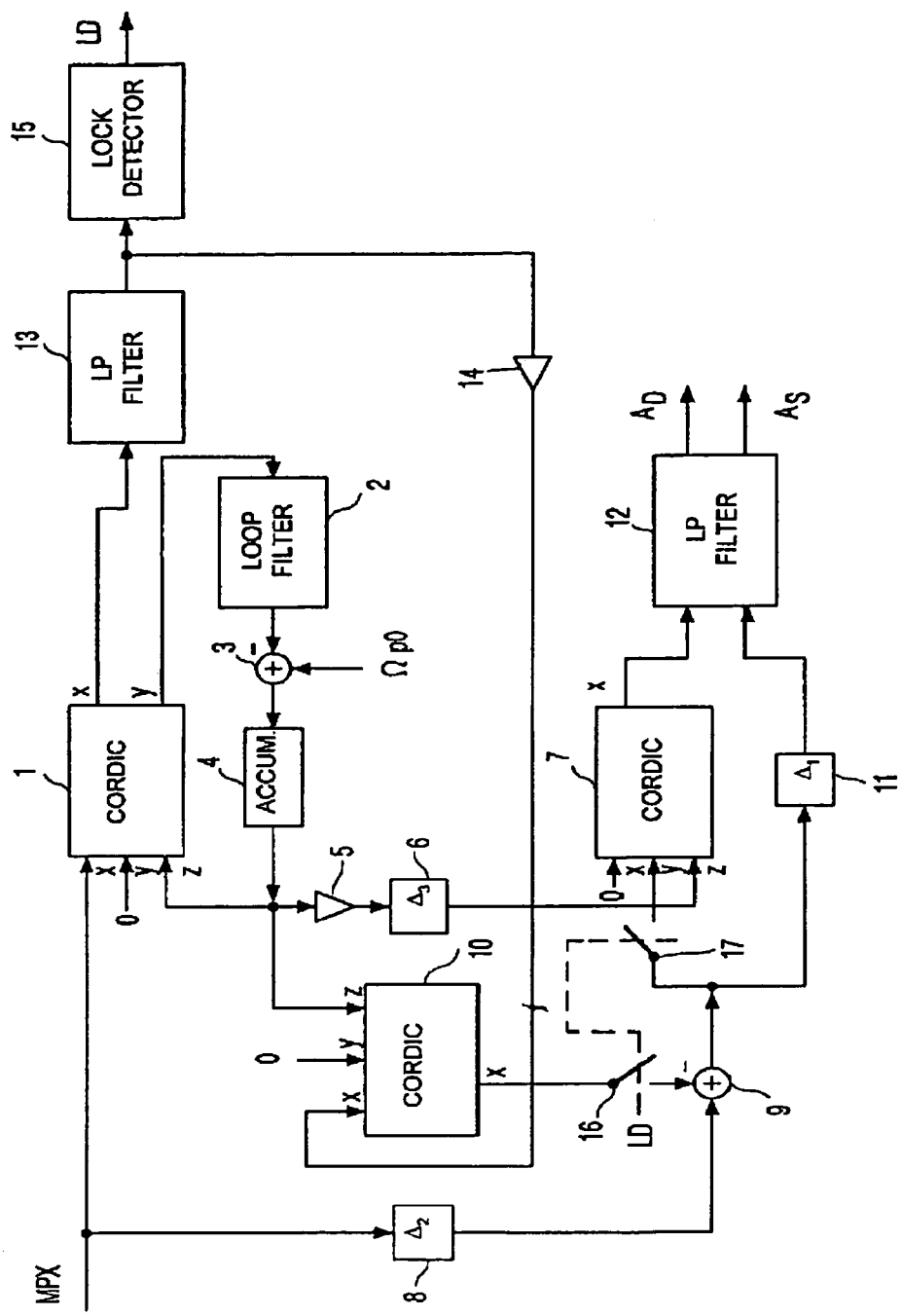

DIGITAL AM DEMODULATOR

The invention relates to a digital demodulator for AM demodulation of a difference sound signal in a digital multiplex signal, which multiplex signal also comprises a sum sound signal in the baseband position and a pilot carrier at a pilot frequency, and the difference sound signal is modulated on a carrier at twice the pilot frequency.

Such multiplex signals are used both for television and radio applications. The demodulator should demodulate those signal components which are not in the baseband position in the multiplex signal. Advantageously, a pilot carrier suppression is desirable in many cases.

Concepts of known analog demodulators for such signals cannot be usefully transferred to digital signal processing. Furthermore, in contrast to analog demodulators, digital demodulators should be free from adjustment.

It is therefore an object of the invention to provide a digital demodulator which, with a minimum number of components, operates without adjustment.

This object is achieved in that CORDICs ("Coordinate Rotational Digital Computers") are provided which perform a coordinate transformation of polar coordinates into cartesian coordinates and each have a phase input, two amplitude inputs assigned to the coordinates x and y and two outputs assigned to the coordinates x and y, in that a phase-locked loop comprising a first CORDIC, a loop filter and an accumulator are provided, which phase-locked loop supplies a phase ramp signal whose repetition frequency is dependent on the input signal of the accumulator, in that the multiplex signal at an amplitude input of the first CORDIC, the output signal of the accumulator at the phase input of the first CORDIC and that output of the first CORDIC which is not assigned to the same coordinate as the amplitude input used are applied to the loop filter whose output signal is superimposed by means of a first superposition stage on a frequency selection signal indicating a pilot nominal frequency, and the output signal of the superposition stage is applied to the accumulator input, in that a second CORDIC is provided one amplitude input of which receives the multiplex signal with the suppressed pilot and the phase input of which receives the output signal from a multiplier whose input receives the output signal from the accumulator and multiplies said output signal by a factor of two, and in that the output of the second CORDIC supplies the demodulated difference sound signal.

The demodulator comprises so-called CORDICs, "Coordinate Rotational Digital Computers" are known per se, for example, from the document "A unified algorithm for elementary functions" by J. S. Walther, published in Spring Yoint Computer conference 1071, pp. 379–385.

In a CORDIC, simple signal operations such as, for example, binary shifts, additions, subtractions and calling up constants can be performed. CORDICs have a simple and compact structure which can be easily integrated.

As is also realized in the invention, a CORDIC may operate in a so-called rotational mode in which it converts a polar signal into a cartesian signal. For this purpose, it has two amplitude inputs and one phase input at which it receives a signal in polar coordinates. A quadrature signal may be applied to the two amplitude inputs; however, it may also receive a single signal at only one of the two amplitude inputs. At two outputs, the CORDIC supplies the signal converted into cartesian coordinates.

According to the invention, a first CORDIC in the phase-locked loop is used in connection with an accumulator which also forms part of the phase-locked loop. The accumulator supplies a sawtooth signal which is applied to the phase input of the CORDIC. In this circuitry, CORDIC and accumulator are comparable with mixers and oscillators in analog phase-locked loops.

The frequency or the frequency spectrum received at an amplitude input by the first CORDIC which forms part of the phase-locked loop is mixed with the repetition frequency of the sawtooth signal supplied by the accumulator so that corresponding frequency shifts of the frequency spectrum of the input signal are produced, likewise as in known analog mixers. This property of the CORDICs in cooperation with the accumulator is utilized in the circuit arrangement according to the invention.

Fundamentally, it is not important which of the two amplitude inputs of the first CORDIC is used because the output signals of the CORDICs are dependent on the selected input only as far as the phase position is concerned. Consequently, the output signal of that output of the CORDIC which does not have the same coordinate assigned to it is applied to the loop filter, similarly as the selected input of the CORDIC. In other words, an input and an output of the CORDIC are selected which do not have the same coordinates assigned to them, i.e. not both of the x or both of the y coordinates.

The output signal of the loop filter is superimposed on a frequency selection signal in a superposition stage. The pilot nominal frequency at which the phase-locked loop should lock in is adjustable by means of the value of this signal. The output signal of the superposition stage is applied to the accumulator input. The repetition frequency of its sawtooth signal, which is also applied to the phase input of the first CORDIC, is dependent on its input signal, i.e. on the frequency selection signal, on the one hand, and on the state of the phase-locked loop, on the other hand.

The digital demodulator according to the invention comprises a second CORDIC which demodulate those signal components in the multiplex signal which are not present in the baseband position. The multiplex signal, preferably with already suppressed pilot, is applied to one of the amplitude inputs of the second CORDIC. The phase input of the second CORDIC again receives the output signal from a multiplier whose input receives the output signal of the accumulator of the phase-locked loop. The multiplier multiplies this signal by a factor of 2, which can be realized in a digital circuit by a simple shift by one position.

In this way it is possible to apply the required pilot frequency to the second CORDIC for demodulating the difference sound signal. This is possible in the circuit in a very simple manner by means of a shift of the output values of the accumulator because the double frequency of the pilot frequency is required for demodulation and the phase-locked loop in the locked state exactly operates at the pilot frequency. The second CORDIC thus provides an extremely precise demodulation of the difference sound signal which is modulated on a carrier at twice the pilot frequency.

The phase-locked loop may be advantageously constructed in such a way that it operates in an extremely narrow band so that a separate pilot filter preceding the amplitude input of the first CORDIC of the phase-locked loop is not necessary. The demodulator operates without adjustments and does not require external components which cannot be integrated.

An embodiment of the invention as defined in claim 2 provides a third CORDIC which is used for pilot suppression.

For this third CORDIC, the signals of the phase-locked loop are used so that a very exact pilot suppression is possible because the phase-locked loop oscillates exactly at the pilot frequency. To this end, an amplitude input of the third CORDIC receives an output signal from the first CORDIC via a low-pass filter. The phase input of the third CORDIC again receives the output signal from the accumulator of the phase-locked loop. The output of the third CORDIC thus supplies a signal which exactly corresponds in frequency, amplitude and phase to the pilot in the multiplex signal and thus leads to its cancellation in a superposition stage.

The multiplex signal which is supplied by the superposition stage and in which the pilot carrier is suppressed can be advantageously applied to one of the amplitude inputs of the third CORDIC.

The third CORDIC thus allows an extremely precise and effective suppression of the pilot in the multiplex signal.

In accordance with a further embodiment of the invention as defined in claim 3, the low-pass filtered output signal from an amplitude output of the first CORDIC is used for recognizing the locking state of the phase-locked loop. In fact, the locking state of the phase-locked loop can be directly determined from the low-pass filtered signal. Dependent on this locking state, the output signal of the third CORDIC, applied to the superposition stage, as well as the input signal of the second CORDIC can be used advantageously. These signals are only used when the phase-locked loop is in the locked state. Consequently, the circuit arrangement supplies signals at its output only when the phase-locked loop is in the locked state and when the signals represent valid, demodulated signals. During the other periods, possibly occurring interference signals are suppressed.

A sound signal low-pass filter provided in a further embodiment of the invention as defined in claim 4 supplies the sum sound signal of the multiplex signal at its output, as well as the demodulated difference sound signal of this signal. In response to a delay member, which compensates the phase shift by the second CORDIC, these two signals are mutually in the desired phase position.

In further embodiments of the invention as defined in claims 5 and 6, further delay members may be provided which are used for delaying the signal applied to the second superposition stage, by means of which the pilot carrier in the multiplex signal is suppressed, and the signal applied to the phase input of the second CORDIC, such that these signals have the desired phase position. An optimum operation of the second superposition stage and the second CORDIC is thereby ensured.

In accordance with further embodiments of the invention, the digital demodulator according to the invention may be used for demodulating a BTSC signal as is known for television applications, but also for demodulating an FM stereo sound signal for radio applications.

These and other aspects of the invention are apparent from and will be elucidated with reference to the embodiments described hereinafter.

In the drawing,

FIG. 1 shows a block diagram of the digital AM demodulator according to the invention for demodulation and pilot suppression of a multiplex signal, which is a so-called BTSC sound signal for television applications.

Such a signal has a sum sound signal in the baseband position. Furthermore, it has a pilot carrier with a pilot frequency. The signal further includes a difference sound signal which is modulated on a carrier at twice the pilot frequency.

It is an object of the demodulator to supply the filtered sum sound signal and the demodulated difference sound signal.

An essential element of the digital demodulator according to the invention is the so-called CORDIC, which stands for "Coordinate Rotational Digital Computer" and whose function has been explained hereinbefore.

In the rotational mode explained above, in which a CORDIC converts a polar signal into a cartesian signal, the input signals $x_{in}$, $y_{in}$ as well as the phase input $z_{in}$ are related to the output signals $x_{out}$ and $y_{out}$ by means of the following equations:

$$x_{out}+jy_{out}=(x_{in}+jy_{in})\cdot \exp(j\ z_{in})\cdot k_{cordic}=(x_{in}+jy_{in})\cdot (\cos z_{in}+j\sin z_{in})\cdot k_{cordic} \quad (1)$$

When $y_{in}=0$, it also holds that:

$$x_{out}+jy_{out}=x_{in}(\cos z_{in}+j\sin z_{in}) \quad (2)$$

$k_{cordic}$ is a constant which is mostly approximately 1.64.

In the circuit arrangement according to the invention, only one amplitude input of the CORDICs is used every time. For example, when only the amplitude input $x_{in}$ is used and applies a zero signal to the second amplitude input $y_{in}$, then these two equations can be simplified as follows;

$$x_{out}=x_{in}\cdot \cos z_{in}\cdot k_{cordic} \quad (3)$$

$$y_{out}=x_{in}\cdot \sin z_{in}\cdot k_{cordic} \quad (4).$$

When $y_{in}$ is used as an input, it holds that:

$$x_{out}=-y_{in}\sin z_{in}\cdot k_{cordic}$$

$$y_{out}=y_{in}\cos z_{in}\cdot k_{cordic}$$

These equations show that the two output signals $x_{out}$ and $y_{out}$ are distinguished from each other by their phase position only. For the arrangement according to the invention it is, however, essential which output signal is used every time. A corresponding reasoning applies when the $y_{in}$ input is used instead of the $x_{in}$ input. Then a different phase position than with the used $x_{in}$ input is provided for the output signals in their totality, but these signals are also distinguished by their phase position only. It is therefore not prescribed for the CORDICs in the digital demodulator according to the invention which input is to be used. However, it is important that, dependent on which one of the amplitude inputs is actually selected, that amplitude output which supplies an output signal in the desired or required phase position is chosen every time. For the output to be selected and the coordinates assigned thereto, i.e. the outputs $x_{out}$ or $y_{out}$, the selected input and the coordinates assigned thereto, i.e. the amplitude inputs $x_{out}$, or $y_{in}$, are therefore referred to every time.

The sole FIGURE shows a block diagram of a digital AM demodulator according to the invention, the input of which receives the above-mentioned multiplex signal MPX. This signal is applied to one of the amplitude inputs of a first CORDIC 1. In the embodiment shown in the FIGURE, the amplitude input assigned to the x coordinate has been selected. The other amplitude input, the amplitude input assigned to the y coordinate in the embodiment shown in the FIGURE, is set at zero.

Together with a loop filter 2 and an accumulator 4, the first CORDIC 1 constitutes a phase-locked loop.

The loop filter 2 receives the output signal from that output of the first CORDIC to which the coordinate other than to the selected input is assigned. Since in the embodiment shown in the FIGURE, the selected input is assigned to the x coordinate, the output whose signal is applied to the loop filter 2 and has the y coordinate assigned to it is selected. The loop filter 2 precedes a first superposition stage 3 which receives a frequency selection signal $\Omega_{p0}$ and which subtracts, from this signal, the output signal of the loop filter 2. The first superposition stage 3 precedes an accumulator 4 whose output signal is applied to a phase input z of the first CORDIC 1.

The accumulator 4 supplies a phase ramp signal whose repetition frequency is dependent on its input signal, thus on the frequency selection signal $\Omega_{p0}$ as well as on the output signal of the first CORDIC filtered by the loop filter 2.

The frequency at which the phase-locked loop is to lock in can be adjusted by means of the frequency selection signal $\Omega_{p0}$.

In this circuitry, the first CORDIC and the accumulator jointly have a function which substantially corresponds to that of a mixer and an oscillator in a conventional phase-locked loop. A mixer and a controlled oscillator can thus be realized in a digital phase-locked loop in this simple manner. The phase-locked loop is constructed to lock in on the pilot frequency of the pilot carrier which is present in the multiplex signal MPX. Dependent on its nominal frequency, the frequency selection signal $\Omega_{p0}$ is suitably fixed. The phase-locked loop, constituted by the first CORDIC 1, the loop filter 2 and the accumulator 4, thus oscillates in the locked-in state exactly at the frequency of the pilot carrier in the multiplex signal MPX. This property is utilized hereinafter for demodulation and pilot carrier suppression.

To this end, the output signal of the accumulator 4 is applied to a multiplier 5. This multiplier multiplies this output signal by a factor of 2, which can be realized in an extremely simple manner in digital circuits by shifting the signal by one position. The multiplier 5 precedes a third delay member 6 whose output signal is applied to the phase input z of a second CORDIC 7.

The MPX signal, in which the pilot carrier is suppressed, is applied to an amplitude input of the second CORDIC 7, in the FIGURE to the amplitude input assigned to the y coordinate.

In the embodiment shown in the FIGURE, the multiplex signal MPX is initially delayed by means of a second delay member 8 to such an extent that a possible processing time of the block 10 is compensated, and that a pilot carrier is suppressed in a superposition stage 9 having an inverting input, which suppression will be further described hereinafter. The output signal of the superposition stage 9 is applied to the above-mentioned amplitude input of the second CORDIC 7, whose amplitude output, i.e. the amplitude output assigned to the x coordinate in the embodiment shown in the FIGURE, supplies the demodulated difference sound signal as well as further signal components of the multiplex signal shifted in accordance with the mixing frequency. To filter out these components, the second CORDIC 7 precedes a filter 12 receiving the output signal from the second CORDIC 7 and the output signal, delayed by means of a first delay member 11, from the second superposition stage 9. The first delay member 11 is constituted in such a way that the output of the sound signal low-pass filter 12 supplies the sum sound signal $A_S$ and the difference sound signal $A_D$ in a mutually correct phase position.

The demodulation of the difference sound signal by means of the second CORDIC 7 is therefore realized in an eminent way because its phase input z receives a signal at exactly twice the frequency of the pilot carrier. This in its turn is realized because the above-mentioned digital phase-locked loop operates exactly at the frequency of the pilot carrier and because the multiplier 5 has multiplied this operating frequency by the factor of 2.

The suppression of the pilot carrier in the multiplex signal by means of the second CORDIC 10 and performed in the superposition stage 9 as described hereinbefore, is also realized because the phase-locked loop exactly operates at the pilot carrier frequency. That amplitude output of the first CORDIC 1 which is assigned to the same coordinate as the amplitude input selected as the input supplies a signal which is low-pass filtered by means of a low-pass filter 13 and applied to an amplitude input of the third CORDIC 10 after amplification by means of an amplifier 14. As already explained above, the phase input of the third CORDIC 10 is coupled to the output of the accumulator 4 of the phase-locked loop.

The third CORDIC 10 thus supplies a signal at that amplitude output which is assigned to the same coordinate as the selected amplitude input, i.e. the amplitude output assigned to the x coordinate in the embodiment shown in the FIGURE, which signal exactly corresponds in phase and frequency to the pilot in the multiplex signal MPX. This signal should thus be only subtractively superimposed in the superposition stage 9 so that the pilot is canceled. To compensate possible time delays caused by the circuit elements of the circuit arrangement, the multiplex signal is suitably delayed by means of the second delay member 8.

The output of the superposition stage 9 thus supplies a signal which corresponds to the multiplex signal but in which the pilot carrier is suppressed. In this signal the sum sound signal is subsequently filtered out by means of the sound signal low-pass filter 12 which realizes exactly equal frequencies for two signal paths and also filters the difference sound signal demodulated by means of the second CORDIC 7 and supplies it at its output.

To ensure that the digital AM demodulator supplies an output signal only when this signal is valid and is not disturbed by distortions or by the unlocked state of the phase-locked loop, a lock detector 15 is provided. The lock detector 15 is arranged behind the low-pass filter 13 and detects, with reference to the low-pass filtered output amplitude of the first CORDIC, whether the phase-locked loop is locked and supplies a constant signal of sufficient amplitude. Only during those periods when this is detected and when the phase-locked loop is in the locked state does the lock detector 15 supply a lock detector signal LD which is applied to switches 16 and 17 and causes these switches to close during those periods when this signal occurs.

The first switch 16 is arranged in the signal path between the third CORDIC 10 and the second superposition stage 9. The second switch 17 is arranged in the transmission path between the second superposition stage 9 and the amplitude input of the second CORDIC 7. By means of the switches 16 and 17, the pilot carrier suppression and the AM demodulation of the difference sound signal can be suppressed during those periods when the phase-locked loop is not in the locked state and when a correct demodulation would thus not be possible anyway, for example, when no pilot is present, because a rnono-sound signal is transmitted. However, when the phase-locked loop is in the locked state, the switches are closed and an AM demodulation of the difference sound signal as well as a suppression of the pilot carrier take place.

This is done in a very simple manner by means of the circuit arrangement according to the invention because both the AM demodulation and the suppression of the pilot carrier is realized by means of CORDICs without any further external circuitry and without separate pilot filters. In the circuit arrangement, the CORDICs allow easy realization of a phase-locked loop which operates exactly in frequency and phase at the frequency of the pilot carrier. The signal of the phase-locked loop can therefore be used optimally for the AM demodulation as well as for the pilot carrier suppression which takes place by means of two further CORDICs. Furthermore, the circuit arrangement operates without any adjustment and does not require any elements which cannot be fully integrated.

The invention claimed is:

1. A digital demodulator for AM demodulation of a difference sound signal in a digital multiplex signal, which multiplex signal also comprises a sum sound signal in the baseband position and a pilot carrier at a pilot frequency, and the difference sound signal is modulated on a carrier at twice the pilot frequency, characterized in that CORDICs are provided which perform a coordinate transformation of polar coordinates into cartesian coordinates and which each have a phase input, two amplitude inputs assigned to the coordinates x and y and two outputs assigned to the coordinates x and y, in that a phase-locked loop comprising a first CORDIC, a loop filter and an accumulator are provided, which phase-locked loop supplies a phase ramp signal whose repetition frequency is dependent on the input signal of the accumulator, in that the multiplex signal at an amplitude input of the first CORDIC, the output signal of the accumulator at the phase input of the first CORDIC and that output of the first CORDIC which is not assigned to the same coordinate as the amplitude input used are applied to the loop filter whose output signal is superimposed by means of a first superposition stage on a frequency selection signal indicating a pilot nominal frequency, and the output signal of the superposition stage is applied to the accumulator input, in that a second CORDIC is provided, one amplitude input of which receives the multiplex signal with the suppressed pilot and the phase input of which receives the output signal from a multiplier whose input receives the output signal from the accumulator and multiplies said output signal by a factor of two, and in that the output of the second CORDIC supplies the demodulated difference sound signal.

2. A demodulator as claimed in claim 1, characterized in that a third CORDIC is provided which generates the pilot frequency at the exact phase and frequency, in that a low-pass filter is provided whose input receives the signal from that output which is assigned to the same coordinate as the used amplitude input of the first CORDIC, and whose output signal is applied to an amplitude input of the third CORDIC whose output signal is superimposed in a second superposition stage on the multiplex signal at that output which is assigned to the same coordinate as the used amplitude input, the output of the second superposition stage supplying the signal with the suppressed pilot which is applied to the amplitude input of the second CORDIC.

3. A demodulator as claimed in claim 2, characterized in that the output signal of the low-pass filter is applied to a lock detector which detects when the phase-locked loop is in the locked state and supplies a lock detector signal in dependence upon which the output signal of the third CORDIC and the input signal of the second CORDIC are passed on by means of switches only when the phase-locked loop is in the locked state.

4. A demodulator as claimed in claim 2, characterized in that a sound signal low-pass filter is provided which receives the output signal from that output of the second CORDIC which is not assigned to the same coordinate as the used input, which receives the output signal delayed by means of a first delay member of the second superposition stage, and which supplies the demodulated difference sound signal as well as the filtered sum sound signal at its output.

5. A demodulator as claimed in claim 2, characterized in that a second delay member is provided whose input receives the multiplex signal and whose output signal is applied to the second superposition stage, and which delays the multiplex signal in such a way that the pilot in the multiplex signal is optimally suppressed in the second superposition stage.

6. A demodulator as claimed in claim 1, characterized in that a third delay member is provided which is arranged behind the multiplier and delays the signal applied thereto in such a way that the signals at the amplitude input and the phase input of the second CORDIC are mutually in the desired phase position.

7. A demodulator as claimed in claim 1, characterized in that the multiplex signal is a Broadcast Television System Committee (BTSC) signal whose difference sound signal is compressed.

8. A demodulator as claimed in claim 1, characterized in that the multiplex signal is an FM stereo sound signal.

* * * * *